US006841298B2

United States Patent
Yamashita et al.

(10) Patent No.: US 6,841,298 B2
(45) Date of Patent: Jan. 11, 2005

(54) BATTERY, TAB OF BATTERY AND METHOD OF MANUFACTURE THEREOF

(75) Inventors: Rikiya Yamashita, Shinjuku-Ku (JP); Hiroshi Miyama, Shinjuku-Ku (JP); Kazuki Yamada, Shinjuku-Ku (JP); Masataka Okushita, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/009,488

(22) PCT Filed: Apr. 18, 2001

(86) PCT No.: PCT/JP01/03321

§ 371 (c)(1),
(2), (4) Date: Dec. 13, 2001

(87) PCT Pub. No.: WO01/80330

PCT Pub. Date: Oct. 25, 2001

(65) Prior Publication Data

US 2004/0224225 A1 Nov. 11, 2004

(30) Foreign Application Priority Data

Apr. 19, 2000 (JP) .......................................... 2000-117836
Jan. 18, 2001 (JP) ............................................ 2001-9706

(51) Int. Cl.[7] .............................................. H01M 2/02
(52) U.S. Cl. ........................ 429/179; 429/163; 429/178; 429/181
(58) Field of Search ................................. 429/163, 178, 429/179, 181

(56) References Cited

U.S. PATENT DOCUMENTS

| 5,585,206 A | * 12/1996 | Morris | ........................ 429/161 |
| 5,662,746 A | * 9/1997 | Affinito | ....................... 148/247 |
| 6,011,135 A | * 1/2000 | Mori | ........................... 528/423 |

FOREIGN PATENT DOCUMENTS

| JP | 54-159346 | | 12/1979 | |
| JP | 61-223062 | | 10/1986 | |
| JP | 10-237047 | | 9/1998 | |
| JP | 10-312788 | * | 11/1998 | ............ H01M/2/30 |
| JP | 11-005061 | | 1/1999 | |
| JP | 11-269659 | | 10/1999 | |
| JP | 2000-067823 | | 3/2000 | |
| JP | 2001-059187 | * | 3/2001 | ........... C23C/28/00 |
| JP | 2001-084993 | * | 3/2001 | ............ H01M/2/30 |
| JP | 2001-155713 | | 6/2001 | |

* cited by examiner

*Primary Examiner*—Dah-Wei Yuan
(74) *Attorney, Agent, or Firm*—Parkhurst & Wendel, L.L.P.

(57) ABSTRACT

A lithium ion battery (1) includes a lithium ion battery module (2) provided with tabs (4), and a package 5 holding the lithium ion battery module (2) therein. The package (5) has a sealed peripheral part (5a) sealed by heat-sealing. At least a part of each tab (4) corresponding the sealed peripheral part (5a) is coated with a corrosion-resistant layer (4S).

14 Claims, 8 Drawing Sheets

BATTERY, TAB OF BATTERY AND METHOD OF MANUFACTURE THEREOF

TECHNICAL FIELD

The present invention relates to a battery, a tab for a battery, and a tab manufacturing method.

BACKGROUND ART

Lithium batteries, which are also known as lithium secondary batteries, have a liquid or gelatinous polyelectrolyte, and generate a current by the migration of lithium ions. Lithium batteries include those provided with positive and negative electrodes formed of active polymers.

Lithium batteries are used as power supplies for personal computers, portable remote terminals, such as pocket telephones and PDAs, video cameras, electric vehicles, industrial robots, artificial satellites and the like, and as energy storage batteries.

The package of the lithium ion battery is a cylindrical or parallelepipedic metal can formed by pressing a metal sheet or a pouch formed by working a packaging laminated structure consisting of a base layer, and an aluminum layer and a sealant layer.

Packages for lithium batteries have the following problems. The metal can has rigid walls and hence the shape of the battery is dependent on that of the metal can. Since the hardware is designed so as to conform to the shape of the battery, the dimensions of the hardware are dependent on the shape of the battery, which reduces the degree of freedom of designing the shape of the hardware.

A package, such as a pouch made from a packaging laminated structure for holding a lithium ion battery module therein or an embossed package formed by pressing a packaging laminated structure, has been developed. Such a package does not place any limit to the degree of freedom of designing the shape of hardware. However, any packaging materials sufficiently satisfactory in physical properties and functions required by packages for lithium batteries have not been developed so far. High moistureproof capability or insulating property is a requisite property of packages. Moistureproof capability is particularly important. A packaging laminated structure for forming a package for a lithium ion battery has, as essential components, a base layer, a barrier layer, and a heat-sealable layer. It is confirmed that adhesion between the layers of the packaging laminated structure affects the requisite properties of a package for a lithium ion battery. If adhesion between the barrier layer and the heat-sealable layer is insufficient, external moisture penetrates a package formed from the packaging laminated structure and holding a lithium ion battery module therein package into the package, the electrolyte of the lithium ion battery module reacts with the moisture to produce hydrofluoric acid. The hydrofluoric acid thus produced corrodes the surface of an aluminum layer serving as the barrier layer to cause the delamination of the barrier layer and the heat-sealable layer. Various means for solving such a problem have been proposed.

When sealing a lithium ion battery module in a package, gaps between the tabs of the lithium ion battery and the package must be securely sealed. However, any measures have been taken to prevent the separation of the package from the tabs due to the corrosion of the surfaces of the tabs. Accordingly, the surfaces of the tabs are corroded gradually in a long time, and the heat-sealable layers or the adhesive films of the package bonded to the tabs separate from the tabs and the sealed system of the lithium ion battery is destroyed.

DISCLOSURE OF THE INVENTION

It is an object of the present invention to provide a tab for a battery, having a part bonded to a package or an adhesive film, and perfectly resistant to corrosion by the agency of hydrofluoric acid produced by the interaction of an electrolyte and moisture, and a method of forming a corrosion-resistant surface layer on the tab.

A battery according to the present invention includes a battery module provided with metal tabs, and a package having an innermost heat-sealable layer and holding the battery module therein such that the metal tabs extend outside from the package, wherein the package has a heat-sealed peripheral part, and a part of the tab corresponding to the heat-sealed peripheral part are coated with a corrosion-resistant layer formed by a chemical conversion treatment.

In the battery according to the present invention, the corrosion-resistant layer of the tab may be formed by a phosphate chromate treatment.

In the battery according to the present invention, the corrosion-resistant layer of the tabs may be formed of a resin containing a phenolic resin, and a metal of molybdenum, titanium or zirconium, or a metallic salt.

In the battery according to the present invention, the corrosion-resistant layer of the tab may be formed by a triazine thiol treatment.

In the battery according to the present invention, the package may further comprise a base layer, a bonding layer, and a first corrosion-resistant layer formed by a chemical conversion treatment.

In the battery according to the present invention, the adhesive film may be wound around the tabs.

According to the present invention, a metal tab for a battery including a sealed package having a sealed peripheral part and a lithium ion battery module held in the package, attached to the lithium ion battery module and extending outside through the sealed peripheral part of the package comprises a tab body, and a corrosion-resistant layer formed on a part of the tab body corresponding to the sealed peripheral part of the package by a chemical conversion treatment.

In the tab according to the present invention, the corrosion-resistant layer may be formed by a phosphate chromate treatment.

In the tab according to the present invention, the corrosion-resistant layer of the tab may contain a resin containing a phenolic resin, and a metal of molybdenum, titanium or zirconium, or a metallic salt.

In the tab for a battery according to the present invention, the corrosion-resistant layer of the tab may be formed by a triazine thiol treatment.

According to the present invention, a tab manufacturing method comprises the steps of preparing a metal sheet for forming a tab body, slitting the metal sheet into the tab body, degreasing an entire surface of the tab body, applying a solution prepared by mixing a phosphate, chromic acid, a fluoride and a triazine thiol compound to the degreased surfaces of the tab bodies, and drying the solution applied to the tab body to form a corrosion-resistant layer.

BEST MODE FOR CARRYING OUT THE INVENTION

First Embodiment

FIG. 1(a) is a perspective view of a battery in a first embodiment according to the present invention, FIG. 1(b) is a sectional view taken on line $X_1$—$X_1$ in FIG. 1(a), FIG. 1(c) is a sectional view of parts extending in a package of tabs, FIG. 1(d) is a sectional view of parts bonded to the package of the tabs, FIGS. 2(a) and 2(b) are perspective views of assistance in explaining a pouch as a package for the battery, FIGS. 3(a), 3(b) and 3(c) are a perspective view, an exploded perspective view and a sectional view, respectively, of assistance in explaining an embossed package as a package for the battery, FIGS. 4(a) and 4(b) are sectional views of assistance in explaining the construction of laminated structures for forming packages for batteries according to the present invention, and FIGS. 5(a), 5(b), 5(c), 5(d), 5(e) and 5(f) are a perspective view, sectional views, a perspective view and sectional views, respectively, of tabs combined with adhesive films.

Figure 2:
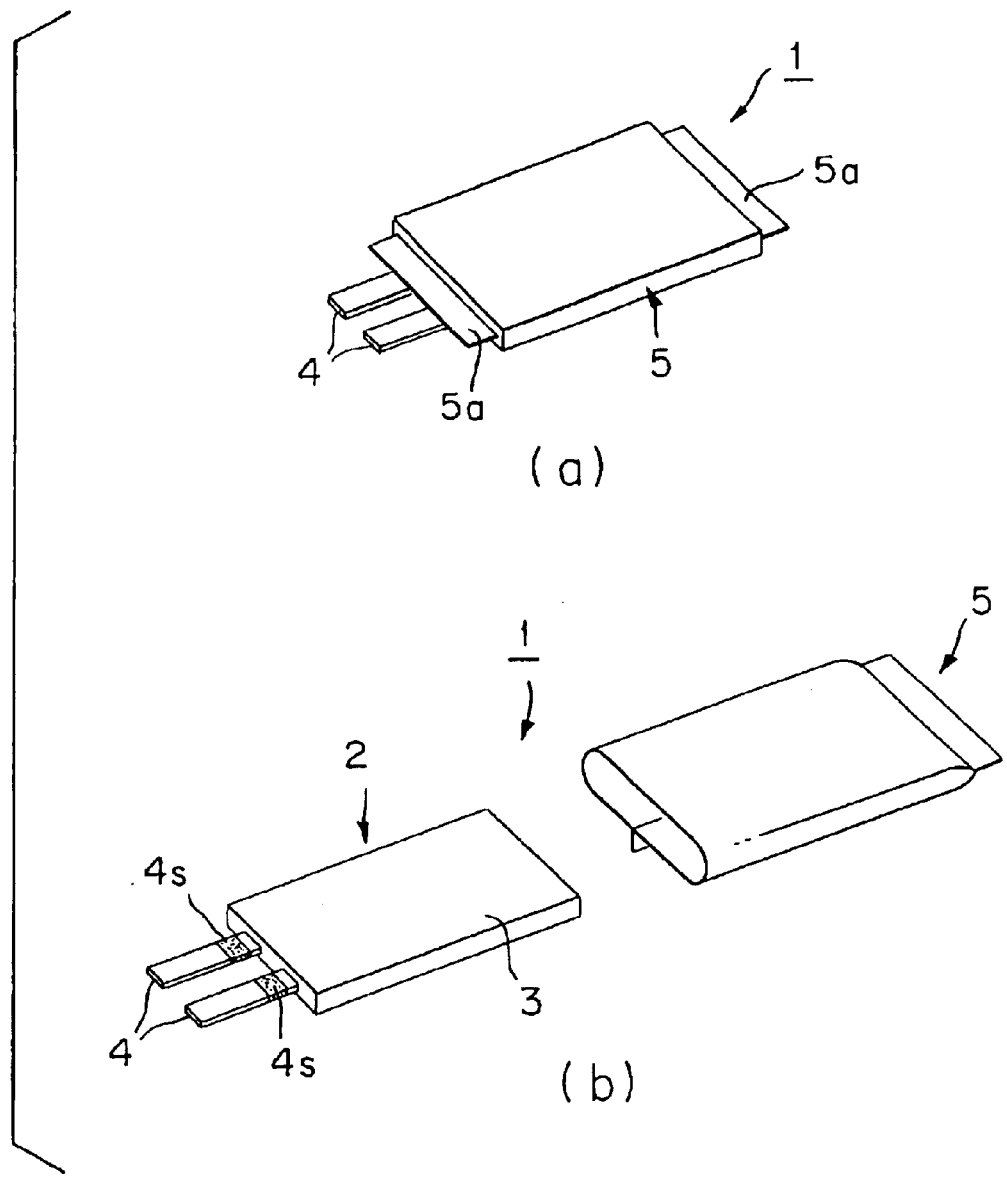
FIG. 2 is a perspective view of assistance in explaining a pouch as a package for a battery.
Figure 3:
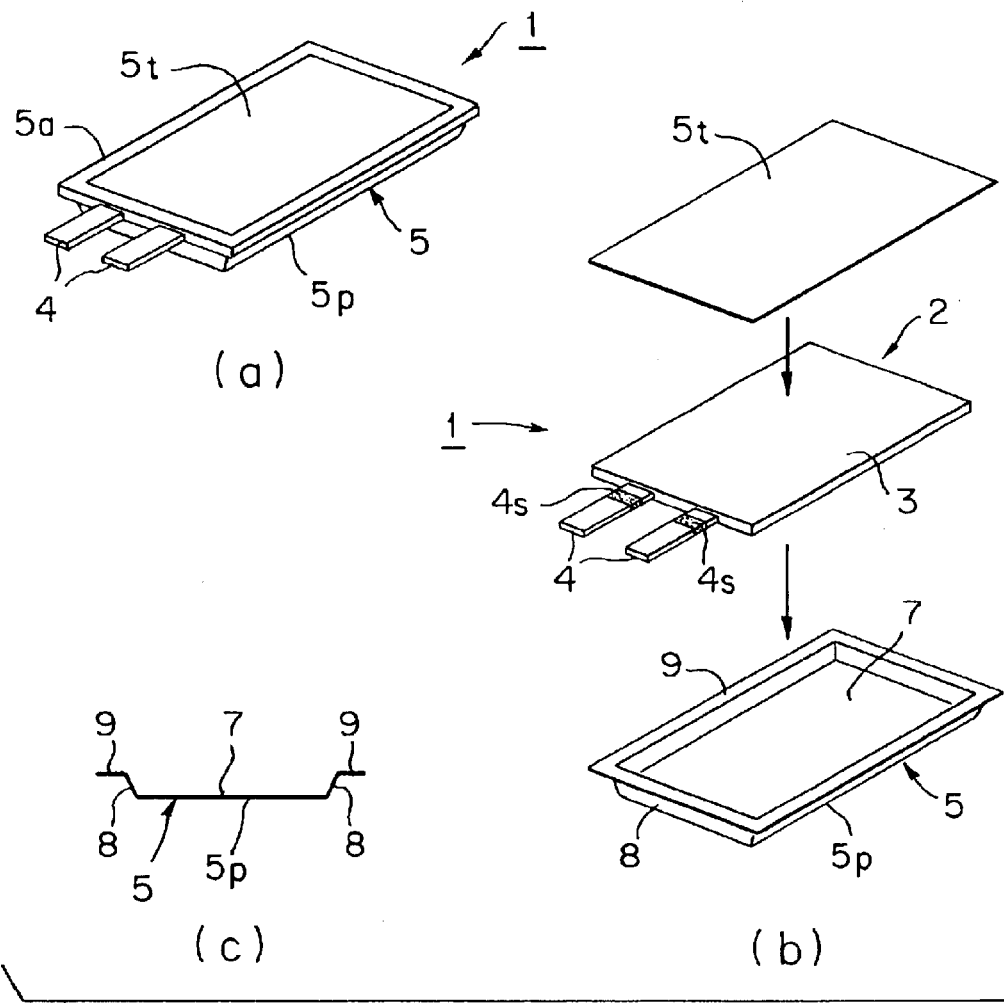
FIG. 3 is a view of assistance in explaining an embossed package as a package for a battery.
Figure 4:
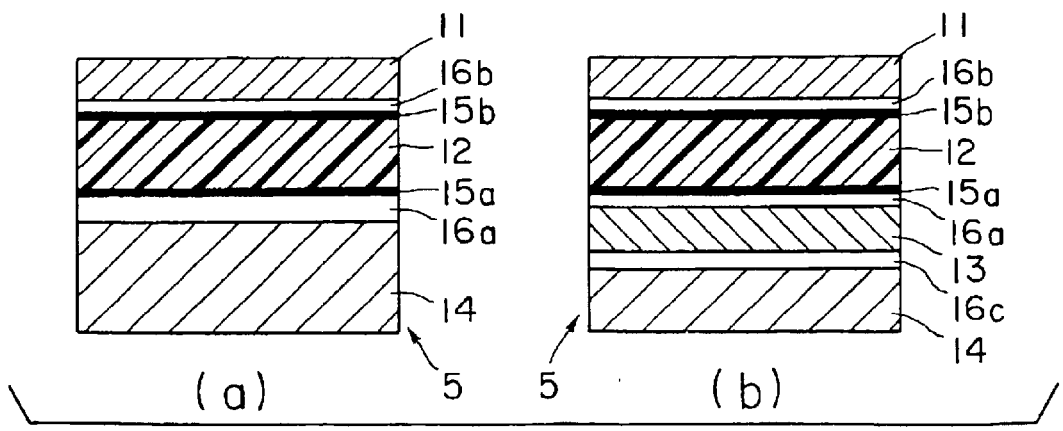
FIG. 4 is a view of assistance in explaining the construction of laminated structures for forming packages according to the present invention for a battery.

The present invention is applicable to either a battery formed by sealing a battery module in a pouch as shown in FIG. 2 or a battery formed by sealing a battery in an embossed package as shown in FIG. 3.

The battery according to the present invention is a device including elements for converting chemical energy into electric energy, such as lithium ion cells, lithium polymer cells or fuel cells, or a capacitor, such as a liquid capacitor, a solid capacitor, a liquid capacitor including a dielectric member of an organic substance or an electrolytic capacitor, such as a double-layer capacitor.

The battery is used as a power supply for personal computers, portable remote terminals (pocket telephones and PDAs) and video camera, industrial robots and artificial satellites and electric vehicles, and as an energy storage battery.

The battery in the first embodiment will be described as an application of the present invention to a lithium ion battery.

Figure 1:
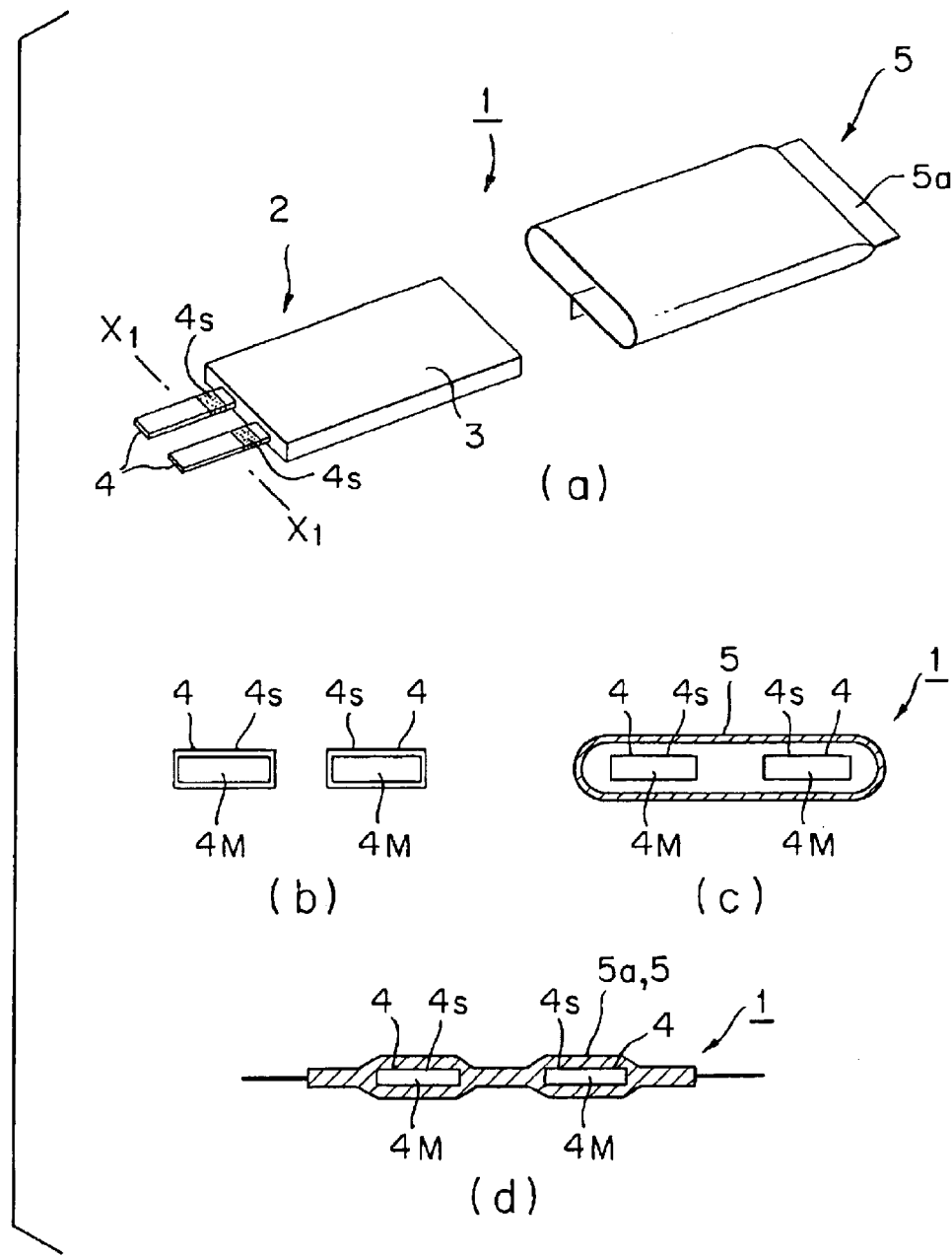
FIG. 1 is a view of a battery in a first embodiment according to the present invention and a battery module provided with tabs.

Referring to FIG. 1, a lithium ion battery 1 includes a lithium ion module 2 having a battery unit 3 and metal tabs 4, and a package 5 holding the lithium ion battery module 2 therein so that the tabs 4 project outside.

The lithium ion battery module 2 is sealed in the package 5 by heat-sealing peripheral parts of the package 5 in sealed parts 5a. Corrosion-resistant layers 4s are formed on parts extending through the sealed parts 5a of the tabs 4.

The lithium ion battery 1 comprises the lithium battery module 2 having a positive electrode collector (aluminum or nickel), a positive electrode active substance layer (metal oxide, carbon black, a metal sulfide, an electrolytic solution or a polymer, such as polyacrylonitrile), an electrolytic layer (an electrolytic solution of propylene carbonate, ethylene carbonate, dimethyl carbonate or ethylene methyl carbonate, an inorganic solid electrolyte of a lithium salt or a gelled electrolyte), a negative electrode active layer (lithium, an alloy, carbon, a liquid electrolyte or a polymer, such as polyacrylonitrile) and a negative collector (copper, nickel or a stainless steel), and the package 5 containing the lithium battery module 2 therein. These components are included in the battery unit 3 or filled in the package 5.

The peripheral parts 5a of the package 5 is sealed after putting the lithium ion battery module 2 in the package 5 to isolate the lithium ion battery module 2 from moisture. The innermost layer of the package 5 is a heat-sealable layer adhesive to the metal tabs 4.

The innermost layer of the package 5 may be not adhesive to metals. If the innermost layer of the package 5 is not adhesive to metals, heat-sealable adhesive films 6 (FIG. 5(a)) adhesive to both the innermost layer of the package 5 and metals are placed between the tabs 4 and the package 5.

It is possible that the surfaces of the tabs 4 made of a metal are corroded by hydrofluoric acid (HF) produced in the electrolyte contained in the package 5 and thereby the tabs 4 are separated from the heat-sealable layer of the package 5 and, consequently, the electrolytic solution leaks from the package 5.

The tabs 4 have a thickness in the range of about 50 to about 200 $\mu$m, and a width in the range of about 5 to about 10 $\mu$m. Possible materials for forming the tabs 4 are Al, Ni, Cu and stainless steels. Stainless steels and Ni are resistant to the corrosive action of hydrofluoric acid, and Al is most subject to corrosion by hydrofluoric acid.

The inventors of the present invention found through studies that the corrosion-resistant layer 4S formed on the tabs 4 prevents the dissolution of the tabs 4 in and the corrosion of the same by hydrofluoric acid (HF) produced by the interaction of the electrolyte of the lithium ion battery module 2 and moisture, improves the adhesion (wettability) of the tabs 4 to the innermost layer of the package 5 or the adhesive films, and is effective in stabilizing adhesion between the tabs 4 and the package 5.

As shown in FIGS. 1(a) and 1(b), the corrosion-resistant layer 4S resistant to the corrosive action of hydrofluoric acid are formed on at least parts of tab bodies 4M corresponding to the sealed peripheral part 5a of the package 5. The corrosion-resistant layers 4S can be satisfactorily bonded to the innermost layer of a laminated structure forming the package 5 or the adhesive films 6 (FIG. 5(a)) by heat-sealing. The layers resistant to the corrosive action of hydrofluoric acid can be formed by a phosphate chromate treatment using a solution prepared by mixing chromium phosphate, chromic acid and such.

The tab 4 provided with the corrosion-resistant layer 4S will be described. A metal sheet, such as an aluminum sheet, is slit by a slitter to make tab bodies 4M of a predetermined width. The entire surface of the tab body 4M is degreased by wetting the tab body 4M with an acid or alkaline solution or by immersing the tab body 4M in an acid or alkaline solution. The acid or alkaline solution is removed from the tab body 4M and the tab body 4M is dried. Then, the tab body 4M is subjected to a chemical conversion treatment using a chromate solution. The chemical conversion treatment can include the steps of immersing the tab body 4M in the chromate solution, spraying the chromate solution on the tab body 4M, or coating the tab body 4M, with the chromate solution by a roll-coating process. The chromate solution is thus applied to the tab body 4M and the chromate solution on the tab body 4M is dried to perform the entire surface of the tab body 4M by the chemical conversion treatment.

Sometimes, the surfaces of the metal sheet are contaminated with oil in a process of forming the metal sheet. Sometimes, oil is used for the protection of the slitter when slitting the metal sheet into tab bodies 4M of the predetermined width. The tab body 4M is subjected to degreasing to remove oily substances and oils from the tab body 4M.

Acid substances suitable for degreasing are inorganic acids including hydrochloric acid, sulfuric acid, nitric acid, hydrofluoric acid, phosphoric acid, sulfamic acid and such, citric acid, gluconic acid, oxalic acid, tartaric acid, formic acid, hydroxyacetic acid, EDTA (ethylenediamine tetraacetic acid), derivatives of EDTA, ammonium thioglycolate and such.

Alkaline substances suitable for degreasing are sodas including sodium hydroxide (NaOH), sodium carbonate ($Na_2CO_3$), sodium bicarbonate ($NaHCO_3$), Glauber's salt ($Na_2SO_4.10H_2O$), sodium sesquicarbonate ($Na_2CO_3.NaHCO_3.2H_2O$) and such, silicates including ($2Na_2O.SiO_2$, water content: 10 to 40%), ($2Na_2O.SiO_2.9H_2O$), ($Na_2O.2SiO_2$, water content: 42 to 44%) and ($Na_2O.3SiO_2$, water content: 65%), and phosphates including first second and third sodium phosphates ($NaH_2PO_4$, $Na_2HPO_4$, $Na_3PO_4$), sodium pyrophosphate ($Na_4P_2O_7$), sodium hexamethaphosphate (($NaPO_3$)) and sodium tripolyphosphate ($Na_3P_3O_{10}$).

A method of manufacturing the tab 4 for the lithium ion battery will be described. A metal sheet is slit into tab bodies 4M of a predetermined width, and the tab bodies 4M are subjected to a degreasing process. Subsequently, the degreased tab bodies 4M are subjected to the chemical conversion treatment. Although only parts of the tab bodies 4M corresponding to the sealed peripheral part 5a of the package 5 need to be treated by the chemical conversion treatment, it is desirable to treat the tab bodies 4M entirely by an immersion method, a shower method or a roll-coating method.

The phosphate chromate treatment uses a processing solution prepared by mixing a phenolic resin, a chromium fluoride (3) compound and phosphoric acid. The tab bodies 4M are wetted with the processing solution, the processing liquid coating the tab bodies 4M is dried to coat the tab bodies 4M with a film, and the film is baked at a temperature not lower than 180° C. A suitable weight per unit area of the thus dried film is in the range of 8 to 10 $mg/m^2$.

The inventors of the present invention found through studies that the formation of a corrosion-resistant film over the surface of an aluminum layer included, as a barrier layer, in a laminated structure for forming the package 5 is very effective in preventing the dissolution of the surface of the aluminum layer and the corrosion of the same by hydrofluoric acid (HF) produced by the interaction of the electrolyte of the lithium ion battery module and moisture, in improving the adhesion (wettability) of the surface of the aluminum layer, and in stabilizing adhesion between the aluminum layer and the innermost layer of the laminated structure. The inventors found also that the corrosion-resistant layer 4S, i.e., a film resistant to the corrosive action of hydrofluoric acid, formed on the tab 4 has an excellent effect.

The chemical conversion treatment of the tab bodies 4M after degreasing is carried out by wetting the tab bodies 4M entirely with a processing solution prepared by mixing a phenolic resin, a chromium fluoride (3) compound and phosphoric acid by an immersion method, a shower method or a roll-coating method. Then, the processing liquid applied to the tab bodies 4M is dried to form a film on the tab bodies 4M, and the film is hardened by heating using hot air, far-infrared radiation or the like. A desirable weight per unit area of the film as dried is on the order of 10 $mg/m^2$.

A material for forming the package 5 of the lithium ion battery 1 will be described hereinafter. As shown in FIG. 4(a), a laminated structure for forming the package 5 has, as essential components, a base layer 11, a barrier layer 12 and a heat-sealable layer 14. Those component layers of the laminated structure are laminated by a dry-lamination process, a sandwich-lamination process, an extrusion-lamination process and/or a thermal-lamination process. An intermediate layer 13 may be interposed between the barrier layer 12 and the heat-sealable layer 14 as shown in FIG. 4(b).

The base layer 11 is formed of an oriented polyester or nylon film. Suitable polyester resins for forming the oriented polyester film include polyethylene terephthalate resins, polybutylene terephthalate resins, polyethylene naphthalate resins, polybutylene naphthalate resins, polyester copolymers and polycarbonate resins. Suitable polyamide resins for forming the oriented nylon film include nylon 6, nylon 66, copolymers of nylon 6 and nylon 66, nylon 610 and polymethaxylilene adipamide (MXD6).

When the lithium ion battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the base layer 11 must be 6 μm or above. Preferably, the thickness of the base layer 11 is in the range of 12 to 25 μm.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 μm or above, preferably, in the range of 12 to 25 μm. The following laminated structures 1) to 7) are examples of the laminated base layer 11.

1) Oriented polyethylene terephthalate (PET) resin layer/ Oriented nylon layer
2) Oriented nylon layer/Oriented pet resin layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body, it is preferable that the base layer 11 consists of a plurality of layers and the surface of the base layer 11 is coated with a coating of a fluorocarbon resin, an acrylic resin or a silicone resin. The base layer 11 may be any one of the following laminated films.

3) Fluorocarbon resin layer/oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)

5) Fluorocarbon resin layer/Oriented PET resin layer/Oriented nylon layer
6) Silicone resin layer/Oriented PET resin layer/oriented nylon layer
7) Acrylic resin layer/oriented nylon layer (the acrylic resin layer may be an acrylic resin film or a film formed by spreading an acrylic resin and drying the same.)

The laminated structure for forming the package 5 may be formed by a dry-lamination process, a thermal-lamination process, an extrusion-lamination process, a Sandwich-lamination process and or a coextrusion-lamination process.

The barrier layer 12 prevents the penetration of moisture into the lithium ion battery 1. To stabilize the workability (ease of fabricating pouches or embossing) and to provide the barrier layer 12 with pinhole resistance, the barrier layer 12 has a thickness of 15 $\mu$m or above and is formed from a foil of a metal, such as aluminum or nickel, or a film coated with an inorganic compound, such as silicon dioxide or alumina, by evaporation. Preferably, the barrier layer 12 is an aluminum foil of a thickness in the range of 15 to 80 $\mu$m.

The inventors of the present invention made studies to reduce pinholes and to prevent the cracking of an embossed battery package as shown in FIG. 3 and found that an aluminum having an iron content in the range of 0.3 to 9.0% by weight, preferably, in the range of 0.7 to 2.0% by weight is more satisfactory in ductility than aluminum not containing any iron, and an aluminum foil of such aluminum is less subject to the formation of pinholes when a laminated sheet including the aluminum foil of such aluminum is folded and is more capable of facilitating forming walls of an embossed battery package than an aluminum foil of aluminum not containing any iron. Aluminum having an iron content less than 0.3% by weight is unable to form a satisfactorily pinhole-resistant foil and does not have improved formability. Aluminum having an iron content exceeding 9.0% by weight is unsatisfactory in flexibility and affects adversely to the workability of the laminated structure in forming a pouch. As shown in FIGS. 3(*a*) to 3(*c*), an embossed package 5 includes an embossed package body 5*p* having a hollow 7, side walls 8 and a flange 9, and a lid 5*t* having a peripheral part 5*a* to be bonded to the flange 9 by heat-sealing.

The flexibility, stiffness and hardness of an aluminum foil formed by cold rolling are dependent on annealing conditions. It is preferably to use soft, properly annealed aluminum foils in comparison with those treated by a hardening process and not annealed.

Annealing conditions that affect the flexibility, stiffness and hardness of aluminum foils may be properly determined according to the required workability (ease of forming pouches or embossed packages) of the laminated structure. For example, to prevent the formation of creases or pinholes in making a package by an embossing process, a slightly or completely annealed soft aluminum foil is more preferable than a hard aluminum foil.

It is possible that the surface of the aluminum foil, particularly, aluminum oxide covering the surface of the aluminum foil is dissolved in or is corroded by hydrofluoric acid (HF) produced by the interaction of the electrolyte of the lithium ion battery 1 and moisture. The inventors of the present invention found through studies that the formation of a corrosion-resistant film over the surface of an aluminum layer 12 included in a laminated structure is very effective in preventing the dissolution of the surface of the aluminum layer 12 and the corrosion of the same by hydrofluoric acid, in improving the adhesion (wettability) of the surface of the aluminum layer 12, and in stabilizing adhesion between the aluminum layer 12 and the heat-sealable layer 14.

Although a first corrosion-resistant layer is formed by the chemical conversion treatment only on a surface on the side of the heat-sealable layer 14 of the aluminum layer 12 in the laminated structure, another corrosion-resistant layer may be formed additionally by the chemical conversion treatment on the other surface on the side of the base layer 11 aluminum layer 12.

Desirably, the heat-sealable layer 14 is formed of a material such that the heat-sealable layer 14 of a part of the laminated structure for forming the package 5 of the lithium ion battery can be bonded to the heat-sealable layer 14 of another part of the same laminated structure and to the metal tabs 4 by heat-sealing and is not subject to quality change and deterioration due to the injurious effect of the contents of the package 5 thereon. It was found through studies that a satisfactory heat-sealable layer 14 has a thickness of 10 $\mu$m or above, preferably, in the range of 20 to 100 $\mu$m, and is formed of a material including at least one of unsaturated carboxylic acid graft polyolefin resins including unsaturated carboxylic acid graft polyethylene resins, unsaturated carboxylic acid graft polypropylene resins and unsaturated carboxylic acid graft polymethylpentene resins, and having a melting point of 80° C. or above and a Vicat softening point of 70° C. or above, copolymers of metal ion crosslinked polyethylene resins, ethylene or propylene, and acrylic acid or methacrylic acid, and modified resins obtained by modifying those resins.

The heat-sealable layer 14 may be formed of a material not adhesive to metals, such as a polyolefin resin. When the heat-sealable layer 14 is formed of a material not adhesive to metals, the tabs 4 and the package can be perfectly bonded and the package 5 can be sealed by placing a thermoadhesive film having a thickness of 15 $\mu$m or above and formed of a unsaturated carboxylic acid graft polyolefin resin, a metal-crosslinked polyethylene resin, or a copolymer of ethylene or propylene, and acrylic acid or methacrylic acid between the tab 4 and the heat-sealable layer 14.

Figure 5:
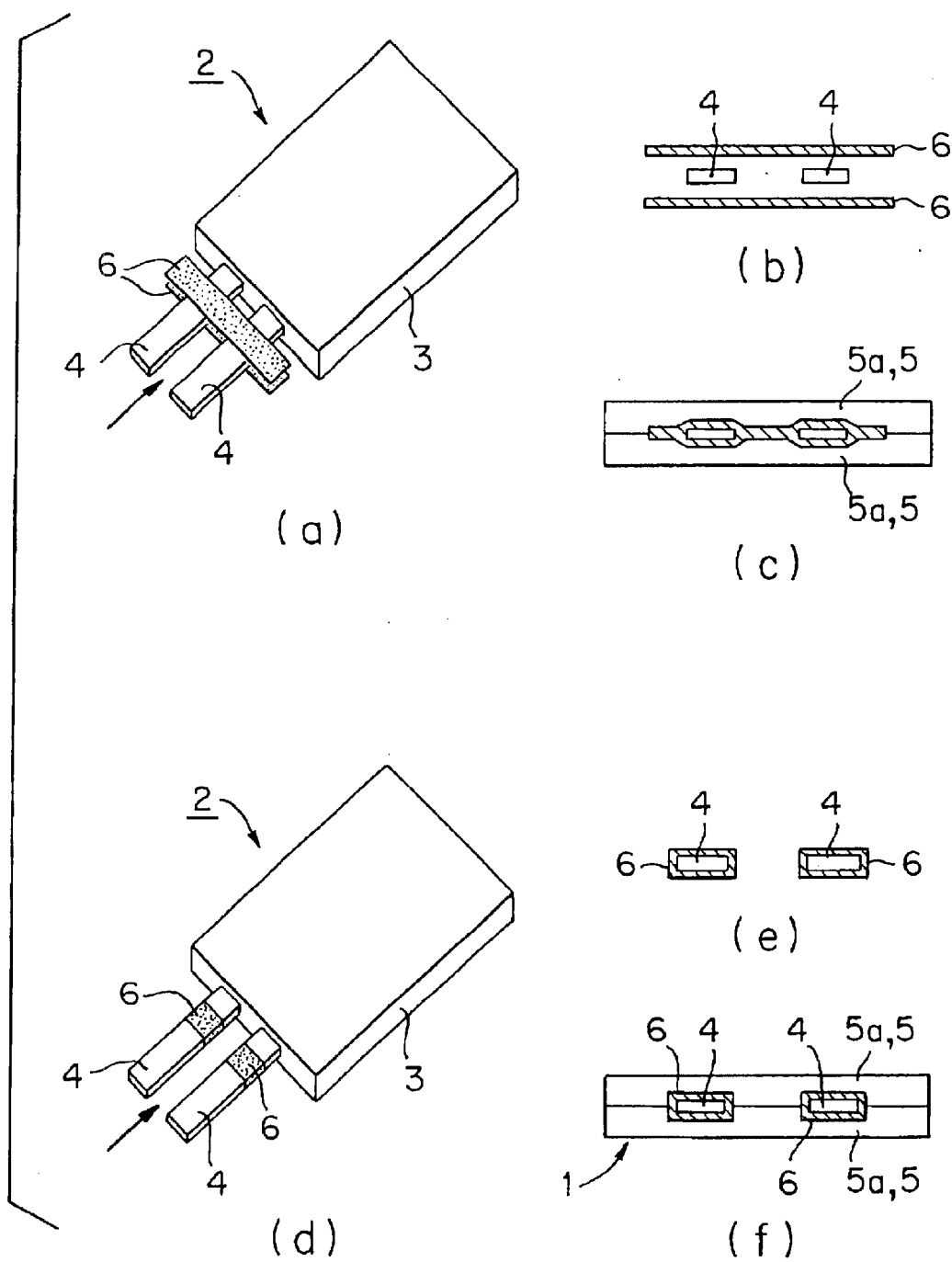
FIG. 5 is a view of assistance in explaining methods of putting adhesive films between a package and tabs.

Adhesive films 6 adhesive to both the tabs 4 and the heat-sealable layer 14 may be placed between the tabs 4 and the heat-sealable layers 14 as shown in FIGS. 5(*a*), 5(*b*) and 5(*c*), or may be wound around predetermined parts of the tabs 4 as shown in FIGS. 5(*d*), 5(*e*) and 5(*f*).

Possible materials for forming the adhesive film 6 are unsaturated carboxylic acid graft polyolefin resins, metal-crosslinked polyethylene resins, and copolymers of ethylene or propylene, and acrylic acid or methacrylic acid.

The heat-sealable layer 14 of the laminated structure forming the package 5 may be a single layer of the aforesaid resin or a plurality of layers including a layer of the aforesaid resin.

The unsaturated carboxylic acid graft polyolefin resins suitable for forming the heat-sealable layer 14 are satisfactory in adhesion to the tabs 4, heat resistance, cold resistance and workability (ease of fabricating pouches or embossing). If the thickness of the heat-sealable layer 14 is less than 20 $\mu$m, gaps are formed between the tabs 4 and the heat-sealable layers 14 of opposite parts of the laminated structure when the heat-sealable layers 14 of the opposite parts of the laminated structure are bonded together by heat-sealing and the package 5 cannot be perfectly sealed. Even if the thickness of the heat-sealable layer 14 is increased beyond 100 $\mu$m, the sealing effect of the heat-sealable layer 14 does not increase accordingly, and the thickness of the laminated structure increases, which is contrary to the object of the present invention to form the lithium ion battery in a small size.

If the resin forming the heat-sealable layer 14 has an excessively low melting point and an excessively low Vicat softening point, the heat resistance and cold resistance of the heat-sealable layer 14 is unsatisfactory, adhesion between the heat-sealable layers 14 and adhesion between the heat-sealable layer 14 and the tabs 4 are insufficient. Consequently, the sealed-parts of the package 5, such as a pouch, would be open. The foregoing unsaturated carboxylic acid graft polymers may be used individually for forming the heat-sealable layer 14 or a mixture having satisfactory properties of some of those polymers may be used for forming the heat-sealable layer 14.

Each of the component layers of the laminated structure according to the present invention may be treated by a surface activation treatment, such as a corona discharge treatment, a blasting treatment, an oxidation treatment or an ozone treatment, to improve and stabilize the film-forming property, lamination property and workability (ease of forming pouches or embossing).

Possible processes of forming the base layer 11, the barrier layer 12, the intermediate layer 13 and the heat-sealable layer 14 of the laminated structure for forming the package 5 include a T-die process, an inflation process and a coextrusion process. When necessary, a secondary film may be formed by a coating process, an evaporation process, an ultraviolet curing process or an electron beam curing process.

Possible processes of laminating those layers include a dry-lamination process, an extrusion-lamination process, a coextrusion-lamination process and a thermal-lamination process.

When laminating the component layers of the laminated structure by a dry-lamination process, adhesive layers 16a, 16b and 16c as shown in FIGS. 4(a) and 4(b) may be used. Possible materials for forming the adhesive layers 16a, 16b and 16c are polyester resins, polyethylene imine resins, polyether resins, cyanoacrylate resins, polyurethane resins, organic titanium compounds, polyether polyurethane resins, epoxy resins, polyester polyurethane resins, imide resins, isocyanate resins, polyolefin resins and silicone resins.

An additive may be added to those materials for forming the adhesive layers 16a, 16b and 16c to improve the chemical resistance and solvent resistance of the adhesive layers 16a, 16b and 16c. Possible additives include at least one of silicon dioxide, calcium carbonate, zinc, minium, lead suboxide, lead dioxide, lead cyanamide, zinc chromate, barium potassium chromate and barium zinc chromate. Silicon dioxide, calciumcarbonate, zinc, minium, lead suboxide, lead dioxide, lead cyanamide, zinc chromate, barium potassium chromate and barium zinc chromate are capable of absorbing and adsorbing hydrofluoric acid produced by interaction between an electrolyte and moisture and have an effect of preventing the corrosion of the layers, particularly, the barrier layer (aluminum layer) by hydrofluoric acid.

An adhesive layer of a thickness on the order of 1 $\mu$m may be formed on the surface of the layer or the surface of the layer may be finished by a surface activation treatment, such as an ozone treatment, to enhance and stabilize the adhesion between the layers when laminating the layers by the extrusion-lamination process. Possible materials for forming the adhesive layer are polyester resins, polyether resins, polyurethane resins, polyether polyurethane resins, polyester polyurethane resins, isocyanate resins, polyolefin resins, polyethylene imine resins, cyanoacrylate resins, organic titanium compounds, epoxy resins, imide resins, silicone resins, modified resins obtained by modifying those resins and mixtures of some of those resins.

An unsaturated carboxylic acid graft polyolefin resin may be used ad an adhesive for bonding together the layers by the extrusion-lamination process or the thermal-lamination process to improve adhesion between the layers and to enhance the chemical resistance of the laminated structure.

EXAMPLES

Examples of the tabs of the lithium ion battery and a method of processing the tab bodies by the chemical conversion treatment will be described.

The following conditions are common to examples of the present invention and comparative examples.

(1) The tab 4 as a positive electrode is made of nickel and the tab 4 as a negative electrode is made of aluminum. The tabs 4 are 8 mm in width, 50 mm in length and 100 $\mu$m in thickness.

(2) Pouches 5 are of a pillow type, are 60 mm in width and 80 mm in length, and have sealed fins of 5 mm in width.

(3) Embossed packages 5 are of a one-side pressed type provided with a hollow part of 35 mm in width, 50 mm in length and 3.5 mm in depth, a flange 9 (sealed part) of 5 mm in width.

(4) The tabs 4 cut in a size for attachment to the lithium ion battery module 2 were subjected to the degreasing process and the chemical conversion treatment. In a practical tab manufacturing process, long strips obtained by slitting a metal sheet for forming the tab bodies 4M are subjected to the degreasing process and the chemical conversion treatment.

Example 1-1 (Pouch)

1. Tab bodies were immersed in a 0.1 N sulfuric acid solution for 10 s (second), the tab bodies were cleaned with water and the thus cleaned tab bodies were dried. Subsequently, the tab bodies were immersed in a solution containing a phenolic resin, a chromium fluoride (3) compound and phosphoric acid for 5 S. The tab bodies wetted with the solution were dried with hot air. The dried tab bodies were heated by a far infrared heater to heat the substance coating the tab bodies at 190° C. to complete tabs. The tabs were bonded to a lithium cell to complete a lithium ion battery module.

2. A laminated structure for forming the package was made by the following procedure.

One of the surfaces of a 20 $\mu$m thick aluminum foil was subjected to a chemical conversion treatment. A 16 $\mu$m thick oriented polyester resin film was laminated to the other surface of the aluminum foil by a dry-lamination process. A 50 $\mu$m thick film of an acid-denatured polypropylene resin was laminated to the surface treated by the chemical conversion treatment of the aluminum foil by a dry-lamination process to obtain a sample laminated structure. The sample laminated structure was processed to form pouches.

3. The battery module was put in the pouch, and an open end part of the pouch was sealed in a sealed fin by heat-sealing so that the tabs extend through the sealed fin to obtain a lithium ion battery in Example 1-1.

Example 1-2 (Embossed Package)

1. Tab bodies were immersed in a 1.0 N sodium hydroxide solution for 10 s, the tab bodies were cleaned with water and the thus cleaned tab bodies were dried. Subsequently, the tab bodies were immersed in a solution containing a phenolic resin, a chromium fluoride (3) compound and phosphoric acid for 5 S. The tab bodies wetted with the solution were dried with hot air. The dried tab bodies were heated by a far infrared heater to heat the substance covering the tab bodies at 190° C. to complete tabs. The tabs were bonded to a lithium cell to complete a lithium ion battery module.

2. Both the surfaces of a 40 μm thick aluminum foil were subjected to a chemical conversion treatment. A 25 μm thick oriented nylon film was laminated to one of the surfaces of the aluminum foil by a dry-lamination process. A 50 μm thick molten resin film of a middle-density polyethylene resin (MDPE resin), as a heat-sealable layer, was extruded on the other surface of the aluminum foil, processing the surface of the molten resin film to be bonded to the aluminum foil by an ozone treatment to form a laminated structure. The laminated structure was heated at a temperature not lower than the softening point of the MDPE resin to obtain a sample laminated structure. The sample laminated structure was pressed to form an embossed package body and was cut to form a lid.

3. The tabs held between 100 μm thick adhesive films of an acid-denatured liner low-density polyethylene resin (acid-denatured LLDPE resin) were attached to a battery module, the battery module was placed in the hollow part of the embossed package body, the lid was put on the embossed package body and a peripheral part of the lid was bonded to the flange of the embossed package body by heat-sealing to obtain a sample lithium ion battery in Example 1-2.

Comparative Example 1-1 (Pouch)

1. Tabs were immersed in a 0.1 N sulfuric acid solution for 10 s, the tabs were cleaned with water and the thus cleaned tabs were dried. The tabs were bonded to a lithium cell to complete a lithium ion battery module.

2. A laminated structure for forming the package was made by the following procedure.

One of the surfaces of a 20 μm thick aluminum foil was subjected to a chemical conversion treatment. A 16 μm thick oriented polyester resin film was laminated to the other surface of the aluminum foil by a dry-lamination process. A 50 μm thick film of an acid-denatured polypropylene resin was laminated to the surface treated by the chemical conversion treatment of the aluminum foil by a dry-lamination process to obtain a sample laminated structure. The sample laminated structure was processed to form sample pouches in Comparative example 1-1.

3. The battery module was put in the pouch and an end part of the pouch was sealed to form a sealed fin in which the tabs are sealed to obtain a sample lithium ion battery in Comparative example 1-1.

Comparative Example 1-2 (Embossed package)

1. Tab bodies were immersed in a 1 N sulfuric acid solution for 10 s, the tab bodies were cleaned with water and the thus cleaned tab bodies were dried to obtain tabs. The tabs were bonded to a lithium cell to complete a lithium ion battery module.

2. Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick molten resin film of a MDPE resin, as a heat-sealable layer, was extruded on the other surface of the aluminum foil, processing the surface of the molten resin film to be bonded to the aluminum foil by an ozone treatment to form a laminated structure. The laminated structure was heated at a temperature not lower than the softening point of the MDPE resin to obtain a sample laminated structure. The sample laminated structure was pressed to form an embossed package body and was cut to form a lid.

3. The tabs held between 100 μm thick adhesive films of an acid-denatured liner low-density polyethylene resin (acid-denatured LLDPE resin) were attached to a battery module, the battery module was placed in the hollow part of the embossed package body, the lid was put on the embossed package body and the peripheral part of the lid was bonded to the flange of the embossed package body by heat-sealing to obtain a sample lithium ion battery in Comparative example 1-2.

Evaluation

The sample lithium ion batteries were held with the tabs extended downward, 5 g of an electrolyte prepared by adding 1 mol lithium phosphate hexafluoride to a 1:1:1 mixture of ethylene carbonate, diethyl carbonate and dimethyl carbonate was put in each of the sample pouches and embossed packages, and the sample lithium batteries were held at 85° C. for thirty days. Then, the sample lithium ion batteries were examined visually to see if the contents were leaking from the packages through parts around the tabs.

Test Results

None of the sample lithium ion batteries in Examples 1–1 and 1-2 leaked, and parts around the tabs of the packages of the sample lithium ion batteries in Examples 1–1 and 1-2 were satisfactorily sealed. Parts around the negative tabs of aluminum of two sample lithium ion batteries among 1000 sample lithium ion batteries in Comparative example 1-1 leaked. Similarly, Parts around the negative tabs of aluminum of three sample lithium ion batteries among 1000 sample lithium ion batteries in Comparative example 1-2 leaked.

According to the present invention, the tabs are surely bonded to the package, the dissolution and corrosion of the surfaces of the tabs by hydrofluoric acid produced by interaction between the electrolyte of the lithium ion battery and moisture penetrated the package can be prevented, and sealing of parts around the tabs of the package is stabilized.

Second Embodiment

Figure 6:
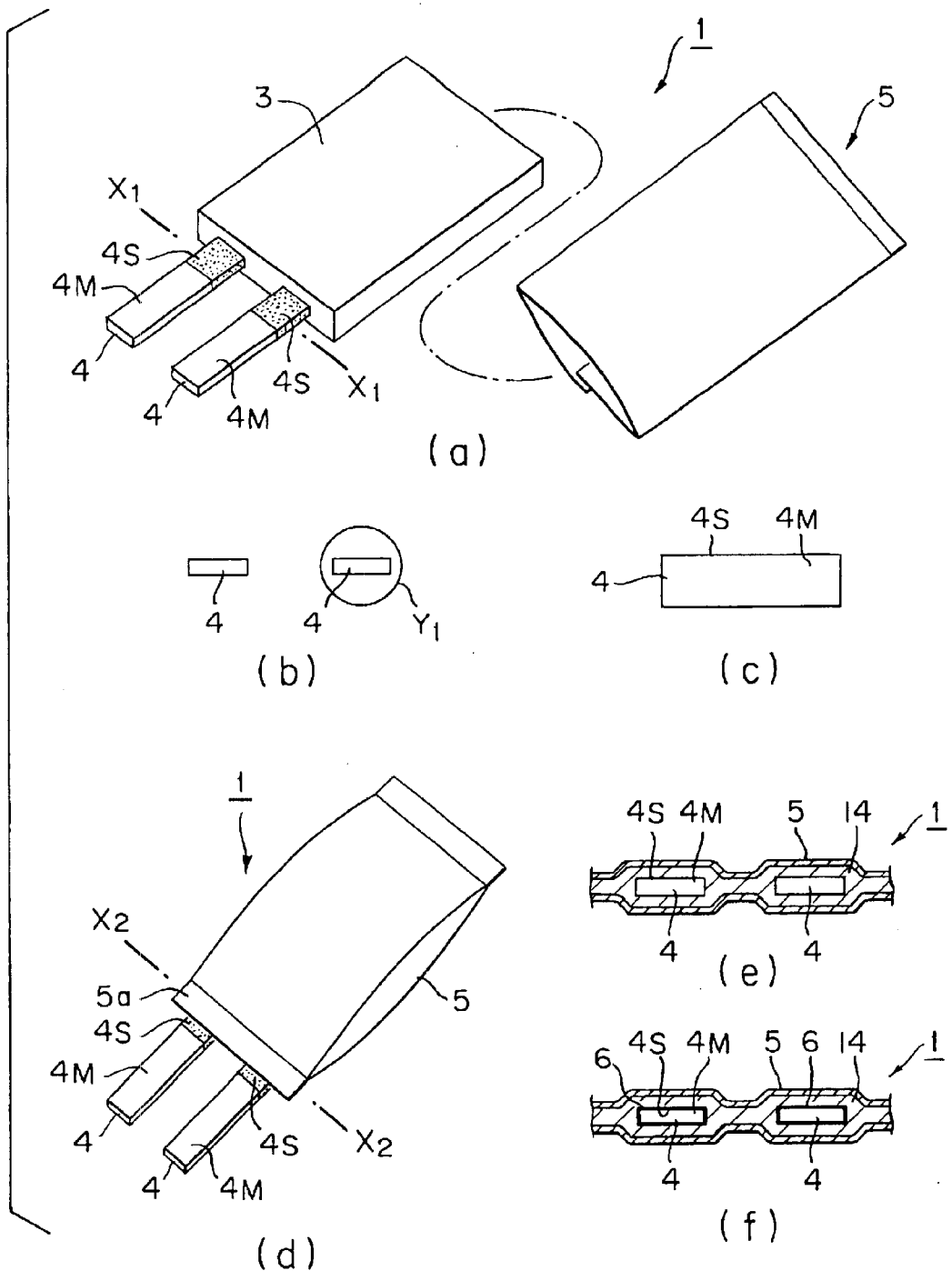
FIG. 6 is a view of a battery in a second embodiment according to the present invention and a battery module provided with tabs.
Figure 7:
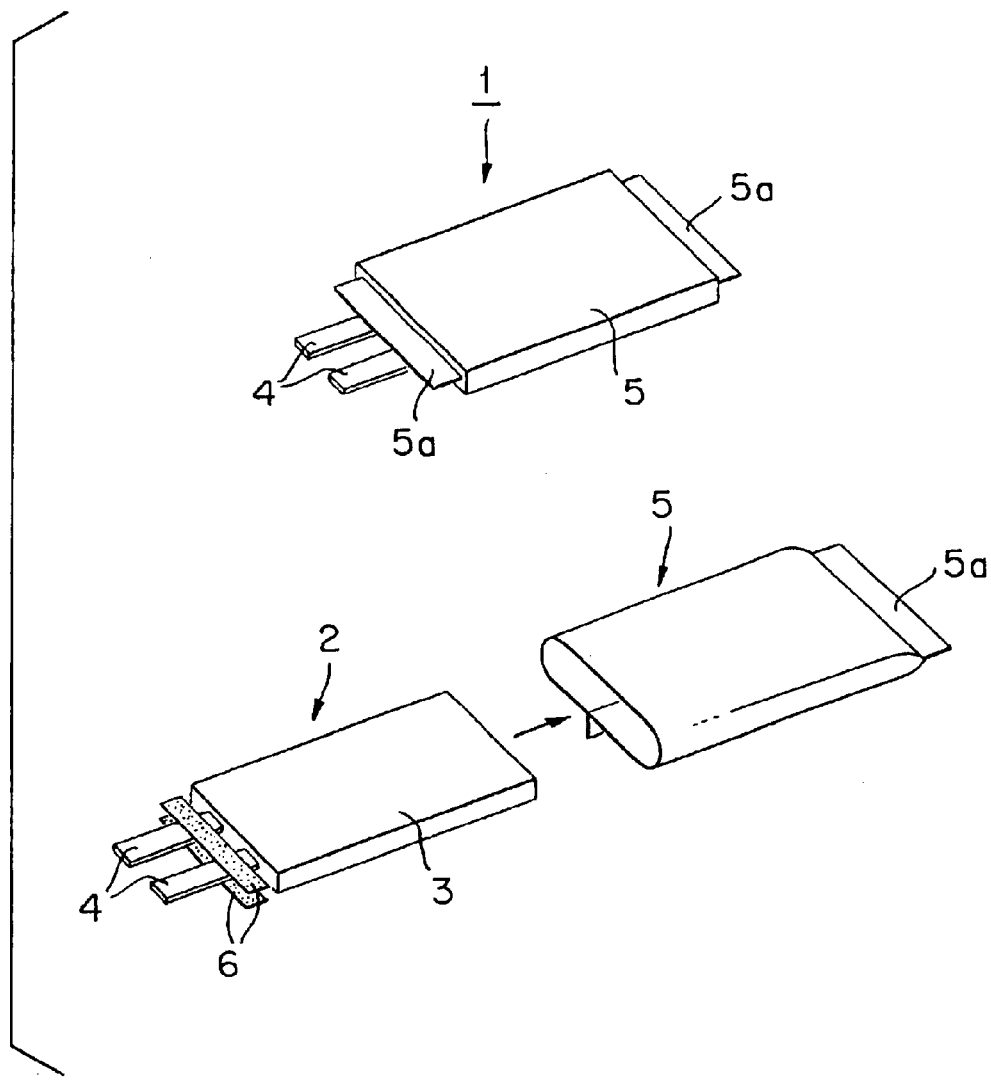
FIG. 7 is a perspective view of a pouch as a package for a battery.

FIG. 6(a) is a perspective view of a lithium ion battery module and a package, FIG. 6(b) is a sectional view taken on line $X_1$—$X_1$ in FIG. 6(a), FIG. 6(c) is an enlarged view of a part $Y_1$ in FIG. 6(b), FIG. 6(d) is a perspective view of a lithium ion battery obtained by putting the lithium ion battery module in a package, FIG. 6(e) is a sectional view taken on line $X_2$—$X_2$ in FIG. 6(d), and FIG. 6(f) is a sectional view taken on line $X_3$—$X_3$ in FIG. 6(d). FIG. 7 is a perspective view of a pouch as a package for a lithium ion battery. FIGS. 8(a), 8(b), 8(c), 8(d) and 8(e) are perspective views, an exploded perspective view and a sectional view, respectively, of embossed packages as packages for batteries. FIG. 9(a) is a sectional view of assistance in explaining a laminated structure for forming a package for a lithium ion battery according to the present invention, and an adhesive film, and FIG. 9(b) is a sectional view of laminated structures, similar to that shown in FIG. 9(a), disposed on the opposite sides of a tab, respectively.

In FIGS. 6 to 9, parts of lithium ion batteries in the second embodiment like or corresponding to those of the parts of the lithium ion batteries in the first embodiment shown in FIGS. 1 to 5 are denoted by the same reference characters and the description thereof will be omitted.

Figure 8:
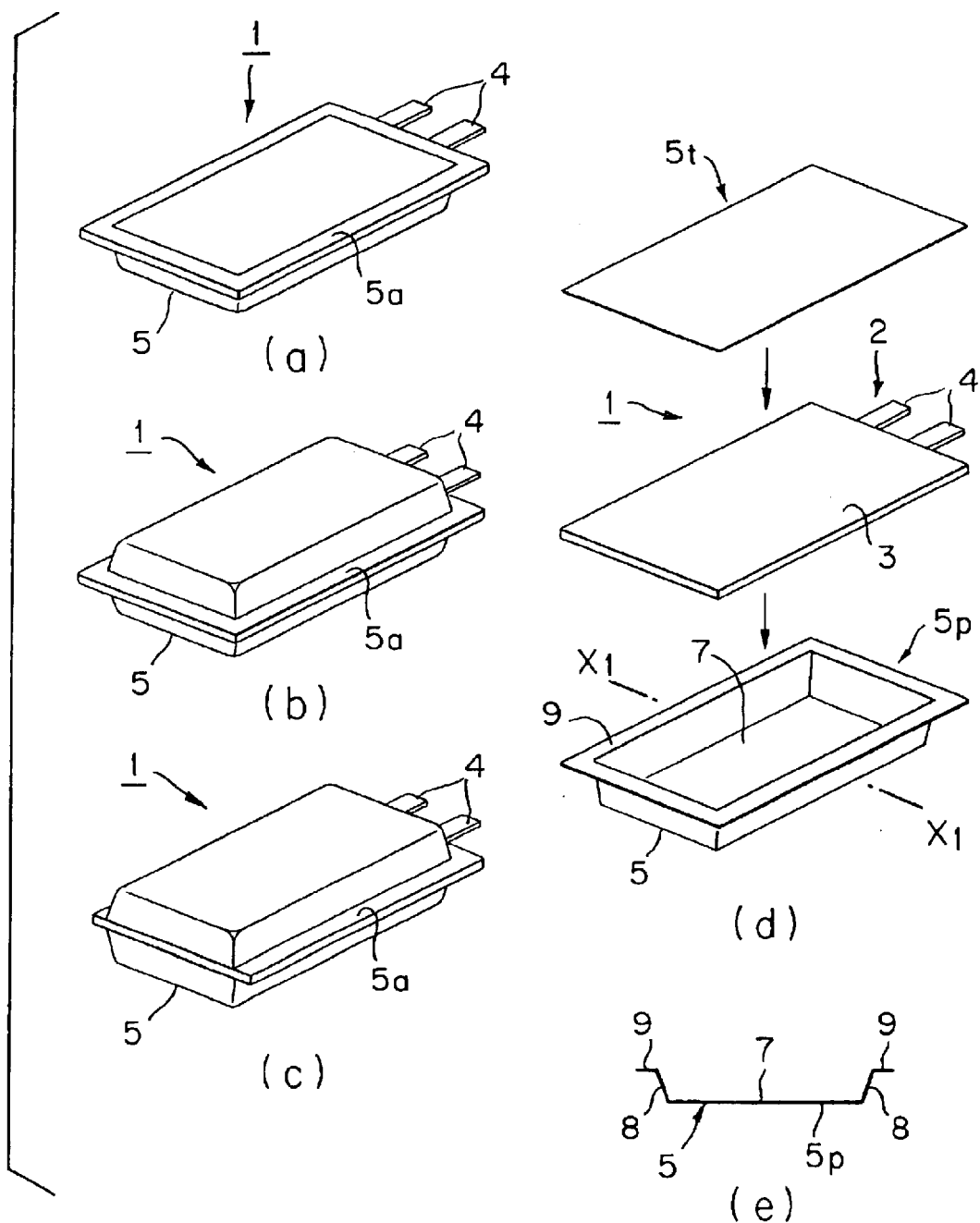
FIG. 8 is a view of embossed packages as packages for batteries.

The present invention is applicable to either a lithium ion battery formed by sealing a lithium ion battery module in a pouch as shown in FIG. 7 or a lithium ion battery formed by sealing a lithium ion battery module in an embossed package as shown in FIG. 8.

Figure 9:
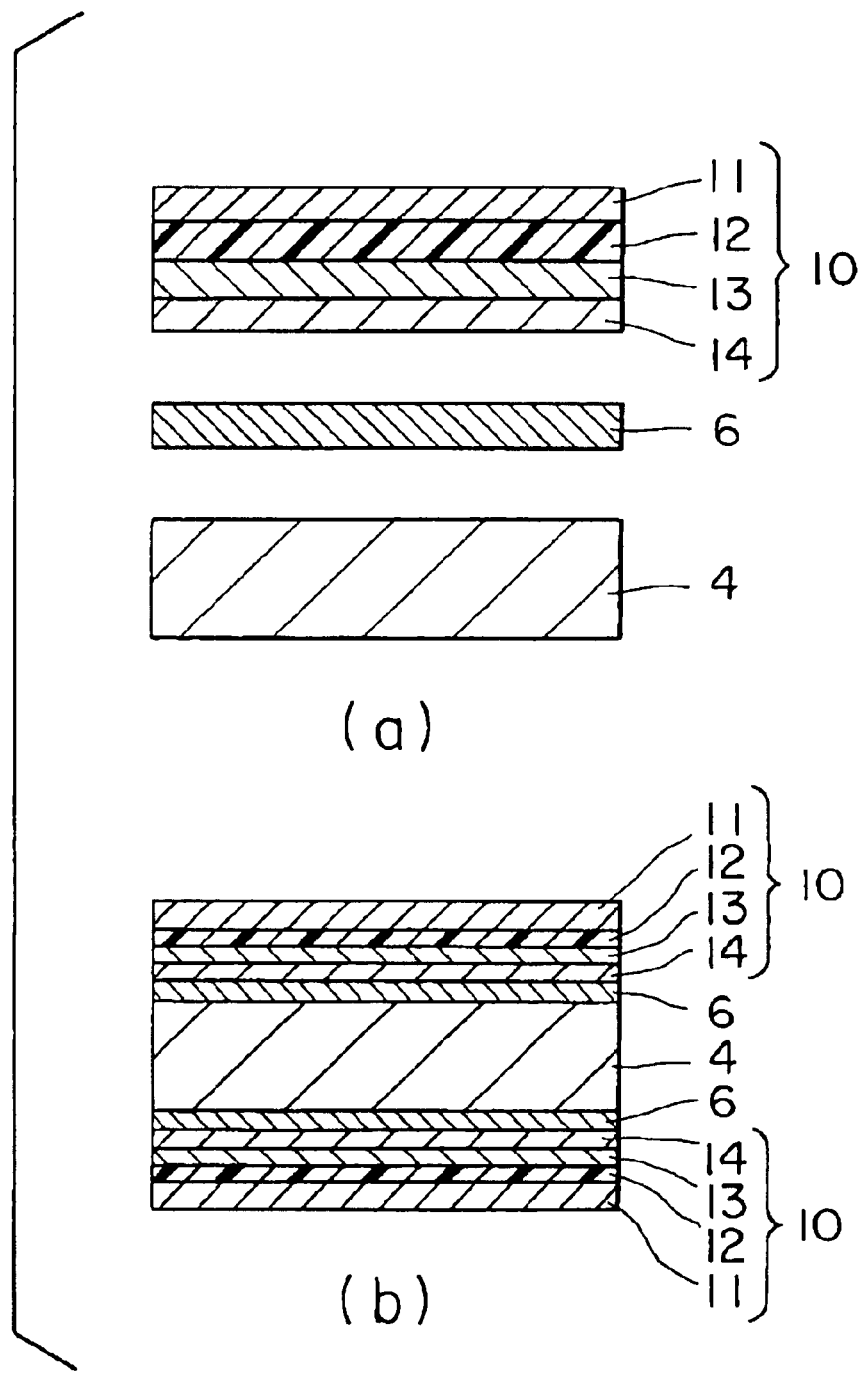
FIG. 9 is a view of laminated structures for forming packages for batteries.

A lithium ion battery module 2 is put in a package 5, a peripheral part of the package 5 is sealed to form a sealed part 5a. The package 5 thus sealed is moistureproof. Parts of the package 5 around metal tabs 4 must be perfectly. Therefore, a laminated structure 10 for forming the package 5 is provided with a heat-sealable layer 14 adhesive to metals as shown in FIG. 9.

Some resins adhesive to metals have poor workability and are expensive, and hence it is general to form the heat-sealable layer 14 of a generally used polyolefin resin, to place the adhesive film 6 adhesive to both a metal and the heat-sealable layer 14 of the laminated structure forming the package between the tabs 4 and the heat-sealable layer 14, and to bond the tabs 4 to the heat-sealable layer 14 by heat-sealing.

It is possible that the surface of the tab 4 formed of a metal is corroded by hydrofluoric acid (HF) produced in the electrolyte of the battery module contained in the package, the tabs 4 separate from the heat-sealable layer 14 and, consequently, the electrolyte leaks from the package.

The tabs 4 have a thickness in the range of 50 to 2000 $\mu$m and a width in the range of about 2.5 to about 20 mm. Possible materials forming the tabs 4 are Al, Cu, Ni-plated cu and Ni.

Nickel tabs are resistant to the corrosive action of hydrofluoric acid, and aluminum tabs are most subject to corrosion by hydrofluoric acid.

The inventors of the present invention found that the corrosion-resistant layer 4S formed on the tab 4 by the chemical conversion treatment of the tabs 4 is very effective in preventing the dissolution and corrosion of the surface of the tab 4 by hydrofluoric acid produced by interaction between the electrolyte of the lithium battery and moisture, improving adhesion (wettability) between the tab 4 and the innermost layer of the package or the adhesive film, and stabilizing adhesion between the tab 4 and the heat-sealable layer 14.

As shown in FIG. 6(a) or 6(c), the corrosion-resistant layer (hereinafter, referred to also as "acid-resistant layer") 4S is formed at least on a part extending through the peripheral part 5a of the package 5 of the tab body 4M.

The acid-resistant layer 4S is formed by, for example, a phosphoric acid chromate treatment using chromium phosphate or chromic acid.

The tab 4 provided with the corrosion-resistant layer 4S will be more concretely described. The inventors of the present invention found through studies that the effect of a corrosion-resistant layer containing at least a resin including a phenolic resin, and a metal, such as molybdenum, titanium or zirconium, or a metallic salt is similar to that of a corrosion-resistant layer formed by a chemical conversion treatment using a chromate solution, and that a corrosion-resistant layer formed by a triazine thiol treatment also is resistant to hydrofluoric acid.

A method of forming the corrosion-resistant layer 4S will be described. When forming the corrosion-resistant layer 4S by a chromate treatment, a metal sheet, such as an aluminum sheet, is slit by a slitter to make tab bodies 4M of a predetermined width. The entire surface of the tab body 4M is degreased by wetting the tab body 4M with an organic solvent, a surface active agent or an acid or alkaline solution or by immersing the tab body 4M in an organic solvent, a surface active agent or an acid or alkaline solution. The organic solvent, the surface active agent or the acid or alkaline solution is removed from the tab body 4M by drying the tab body 4M. Then, the tab body 4M is subjected to a chemical conversion treatment using a chromate solution. The chemical conversion treatment can include immersing the tab body 4M in the chromate solution, spraying the chromate solution on the tab body 4M or coating the tab body 4M with the chromate solution by a roll-coating process. The chromate solution is thus applied to the tab body 4M and the chromate solution applied to the tab body 4M is dried to treat the entire surface of the tab body 4M by the chemical conversion treatment.

A method of manufacturing the tab 4 for the lithium ion battery will be described. A metal sheet is slit into tab bodies 4M of a predetermined width, and the tab bodies 4M are subjected to a degreasing process. Subsequently, the degreased tab bodies 4M are subjected to the chemical conversion treatment. Although only parts of the tab bodies 4M corresponding to the sealed peripheral part 5a of the package 5 need to be treated by the chemical conversion treatment, it is desirable to treat the tab bodies 4M entirely by an immersion method, a shower method or a roll-coating method.

The phosphate chromate treatment requires a processing solution prepared by mixing a phenolic resin, a chromium fluoride (3) compound and phosphoric acid. The tab bodies 4M are wetted with the processing solution, the processing liquid coating the tab bodies 4M is dried to form a film on the tab bodies 4M, and the film is baked at a temperature not lower than 180° C. A suitable weight per unit area of the thus dried film is in the range of 1 to 10 mg/m$^2$.

The inventors of the present invention found through studies that the formation of a corrosion-resistant film over the surface of an aluminum layer included, as a barrier layer, in a laminated structure for forming the package 5 is very effective in preventing the dissolution of the surface of the aluminum layer and the corrosion of the same by hydrofluoric acid (HF) produced by the interaction of the electrolyte of the lithium ion battery module and moisture, in improving the adhesion (wettability) of the surface of the aluminum layer, and in stabilizing adhesion between the aluminum layer and the innermost layer of the laminated structure. The inventors found also that the corrosion-resistant layer 4S, i.e., a film resistant to the corrosive action of hydrofluoric acid, formed on the tab 4 has an excellent effect.

A metal sheet is slit into tab bodies 4M of a predetermined width, the tab bodies 4M are degreased, the tab bodies 4M are wetted entirely with a processing solution prepared by mixing a phenolic resin, a chromium fluoride (3) compound and phosphoric acid by an immersion method, a shower method or a roll-coating method. Then, the processing liquid applied to the tab bodies 4M is dried to coat the tab bodies 4M with a film, and the film is hardened by heating using hot air, far-infrared radiation or such to form a corrosion-resistant layer 4S. A desirable weight per unit area of the film as dried is on the order of 10 mg/m$^2$.

A triazine thiol film, i.e., a corrosion-resistant layer 4S, may be formed by slitting a metal sheet for forming tab bodies 4M for the lithium ion battery into tab bodies 4M of a predetermined width, degreasing the tab bodies 4 and subjecting a processing solution containing triazine thiol and coating the tab bodies 4M to electrolytic polymerization.

A material for forming the package 5 of the lithium ion battery 1 will be described hereinafter. As shown in FIG. 9(a), a laminated structure 10 for forming the package 5 has, as essential components, a base layer 11, a barrier layer 12 of aluminum, and a heat-sealable layer 14. Those component layers of the laminated structure are laminated by a dry-lamination process, a sandwich-lamination process, an extrusion-lamination process and/or a thermal-lamination process. An intermediate layer 13 may be interposed between the barrier layer 12 and the heat-sealable layer 14 as shown in FIG. 9(b).

When the lithium ion battery is used on a device (hardware), the base layer 11 touches the device. Therefore, it is desirable to form the base layer 11 of an intrinsically insulating resin. Since a film forming the base layer 11 has pinholes and pinholes will be formed in the film during processing, the thickness of the base layer 11 must be 6 μm or above. Preferably, the thickness of the base layer 11 is in the range of 12 to 30 μm.

The base layer 11 may be a laminated film in view of providing the base layer 11 with a high pinhole-resistant property and an improved insulating ability.

Preferably, the base layer 11 includes at least one resin layer consisting of two or more layers each having a thickness of 6 μm or above, preferably, in the range of 12 to 25 μm. The following laminated structures 1) to 8) are examples of the laminated base layer 11.
1) Oriented PET resin layer/Oriented nylon layer
2) Oriented nylon layer/Oriented PET resin layer To improve the mechanical aptitude (stability when passed through processing machines and a packaging machine) and surface protecting ability (heat resistance and electrolyte resistance) of the packaging sheet and to reduce friction between a die and the base layer 11 when forming the embossed package body, it is preferable that the base layer 11 consists of a plurality of layers and the surface of the base layer 11 is coated with a coating of a fluorocarbon resin, an acrylic resin, a silicone resin or a mixture of some of those resins. The base layer 11 may be any one of the following laminated films.
3) Fluorocarbon resin layer/Oriented PET resin layer (the fluorocarbon resin layer may be a fluorocarbon resin film or a film formed by spreading a liquid fluorocarbon resin in a film and drying the same.)
4) Silicone resin layer/Oriented PET resin layer (the silicone resin layer may be a silicone resin film or a film formed by spreading a liquid silicone resin in a film and drying the same.)
5) Fluorocarbon resin layer/Oriented PET resin layer/Oriented nylon layer
6) Silicone resin layer/Oriented PET resin layer/Oriented nylon layer
7) Acrylic resin layer/Oriented nylon layer (the acrylic resin layer may be an acrylic resin film or a film formed by spreading an acrylic resin and drying the same.)
8) Layer of a mixture of an acrylic resin and a polysiloxane graft acrylic resin/Oriented nylon layer (the acrylic resin layer may be an acrylic resin film or a film formed by spreading an acrylic resin and drying the same).

The laminated structure for forming the package 5 may be formed by a dry-lamination process, a thermal-lamination process, an extrusion-lamination process, a sandwich-lamination process and or a coextrusion-lamination process.

EXAMPLES

Examples of the tabs of the lithium ion battery and a method of processing the tab bodies by the chemical conversion treatment will be described.

The following conditions are common to examples of the present invention and comparative examples.

(1) The tab 4 as a positive electrode is made of nickel and the tab 4 as a negative electrode is made of aluminum. The tabs 4 are 8 mm in width, 50 mm in length and 100 μm in thickness.
(2) Pouches 5 are of a pillow type, are 60 mm in width and 80 mm in length, and have sealed fins of 5 mm in width.
(3) Embossed packages 5 are of a one-side pressed type provided with a hollow part of 35 mm in width, 50 mm in length and 3.5 mm in depth, a flange 9 (sealed part) of 5 mm in width.
(4) The tabs 4 cut in a size for attachment to the lithium ion battery module 2 were subjected to the degreasing process and the chemical conversion treatment. In a practical tab manufacturing process, long strips obtained by slitting a metal sheet for forming the tab bodies 4M are subjected to the degreasing process and the chemical conversion treatment.

Example 2-1 (Pouch)

1. Tab bodies were immersed in a 0.1 N sulfuric acid solution for 10 s (second), the tab bodies were cleaned with water and the thus cleaned tab bodies were dried. Subsequently, the tab bodies were immersed in a solution containing a phenolic resin, a chromium fluoride (3) compound and phosphoric acid for 5 S. The tab bodies wetted with the solution were dried with hot air. The dried tab bodies were heated by a far infrared heater to heat the substance coating the tab bodies at 190° C. to complete tabs. The tabs were bonded to a lithium cell to complete a lithium ion battery module.

2. A laminated structure for forming the package was made by the following procedure.

One of the surfaces of a 20 μm thick aluminum foil was subjected to a chemical conversion treatment. A 16 μm thick oriented polyester resin film was laminated to the other surface of the aluminum foil by a dry-lamination process. A 50 μm thick film of an acid-denatured polypropylene resin was laminated to the surface treated by the chemical conversion treatment of the aluminum foil by a dry-lamination process to obtain a sample laminated structure. The sample laminated structure was processed to form sample pouches.

3. The lithium ion battery module was put in the pouch, and an end part of the pouch was sealed to form a sealed part by heat-sealing so that the tabs extend through the sealed part to obtain a sample lithium ion battery in Example 2-1.

Example 2-2 (Embossed Package)

1. Tab bodies were immersed in a 1.0 N sodium hydroxide solution for 10 s, the tab bodies were cleaned with water and the thus cleaned tab bodies were dried. Subsequently, the tab bodies were immersed in a solution containing a phenolic resin, a chromium fluoride (3) compound and phosphoric acid for 5 S. The tab bodies wetted with the solution were dried with hot air. The dried tab bodies were heated by a far infrared heater to heat the substance coating the tab bodies at 190° C. to complete tabs. The tabs were bonded to a lithium cell to complete a lithium ion battery module.

2. Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick polypropylene resin film having a density of 0.921 was bonded with a 15 μm thick layer of an acid-denatured polypropylene resin to the other surface of the aluminum foil y sandwich-lamination to form a primary laminated structure. The primary laminated structure was heated at a temperature not lower than the softening point of the acid-denatured polypropylene resin with hot air to obtain a sample secondary laminated structure. The sample secondary laminated structure was pressed to form an embossed package body and was cut to form a lid.

3. The tabs held between 100 μm thick adhesive films of an acid-denatured polypropylene resin were attached to a battery module, the battery module was placed in the hollow part of the embossed package body, the lid was put on the embossed package body and a peripheral part of the lid was bonded to the flange of the embossed package body by heat-sealing to obtain a sample lithium ion battery in Example 2-2.

Example 2-3 (Pouch)

1. Tab bodies were immersed in acetone for 10 s, the tab bodies were dried. Subsequently, the tab bodies were immersed in a first solution containing a phenolic resin, acrylic resin, and hydrogen fluoride and molybdenum, a second solution containing a phenolic resin, acrylic resin, and hydrogen fluoride and titanium, and a third solution containing a phenolic resin, acrylic resin and zirconium. The tab bodies wetted with those solutions were dried with hot air. The dried tab bodies were heated to heat the substances coating the tab bodies at 180° C. to complete tabs. The tabs were bonded to lithium cells to complete a first lithium ion battery module provided with the tabs treated by using the first solution containing molybdenum, a second lithium ion battery module provided with the tabs treated by using the second solution containing titanium, and a third lithium ion battery module provided with the tabs treated by using the third solution containing zirconium.

2. A laminated structure for forming the package was made by the following procedure.

One of the surfaces of a 20 μm thick aluminum foil was subjected to a chemical conversion treatment. A 16 μm thick oriented polyester resin film was laminated to the other surface of the aluminum foil by a dry-lamination process. A 50 μm thick film of an acid-denatured polypropylene resin was laminated to the surface treated by the chemical conversion treatment of the aluminum foil by a dry-lamination process to obtain a sample laminated structure. The sample laminated structure was processed to form sample pouches.

3. The first, the second and the third lithium ion battery module were put in the pouches, and open end parts of the pouches were sealed in sealed parts so that the tabs extend through the sealed parts to obtain sample lithium ion batteries in Example 2-3.

Example 2-4 (Embossed package)

1. Tab bodies were immersed in acetone for 10 s, the tab bodies were dried. Subsequently, the tab bodies were immersed in a first solution containing a phenolic resin, acrylic resin, and hydrogen fluoride and molybdenum, a second solution containing a phenolic resin, acrylic resin, and hydrogen fluoride and titanium, and a third solution containing a phenolic resin, acrylic resin and zirconium. The tab bodies wetted with those solutions were dried with hot air. The dried tab bodies were heated to heat the substances coating the tab bodies at 180° C. to complete tabs. The tabs were bonded to lithium cells to complete a first lithium ion battery module provided with the tabs treated by using the first solution containing molybdenum, a second lithium ion battery module provided with the tabs treated by using the second solution containing titanium, and a third lithium ion battery module provided with the tabs treated by using the third solution containing zirconium.

2. Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick molten resin film of a MDPE resin, as a heat-sealable layer, was extruded on the other surface of the aluminum foil, processing the surface of the molten resin film to be bonded to the aluminum foil by an ozone treatment to form a laminated structure. The laminated structure was heated at a temperature not lower than the softening point of the MDPE resin to obtain a sample laminated structure. The sample laminated structure was pressed to form an embossed package body and was cut to form a lid.

3. The first, the second and the third lithium ion battery module were put in the embossed package bodies, the lids were put on the embossed package bodies, and peripheral parts of the lids were bonded to the flanges of the embossed package bodies by heat-sealing to obtain sample lithium ion batteries in 2–4.

Example 2-5 (Pouch)

1. Tab bodies were immersed in a 0.1 N sulfuric acid solution for 10 s, the tab bodies were cleaned with water and the thus cleaned tab bodies were dried. Subsequently, the tab bodies were subjected to an electroplating process using a triazine thiol solution to obtain plated tabs. The plated tabs were bonded to a lithium cell to complete a lithium ion battery module.

2. A laminated structure for forming the package was made by the following procedure.

One of the surfaces of a 20 μm thick aluminum foil was subjected to a chemical conversion treatment. A 16 μm thick oriented polyester resin film was laminated to the other surface of the aluminum foil by a dry-lamination process. A 50 μm thick film of an acid-denatured polypropylene resin was laminated to the surface treated by the chemical conversion treatment of the aluminum foil by a dry-lamination process to obtain a sample laminated structure. The sample laminated structure was processed to form sample pouches.

3. The lithium ion battery module was put in the pouch, and an end part of the pouch was sealed to form a sealed part by heat-sealing so that the tabs extend through the sealed part to obtain a sample lithium ion battery in Example 2-5.

Example 2-6 (Embossed package)

1. Tab bodies were immersed in a 0.1 N sulfuric acid solution for 10 s, the tab bodies were cleaned with water and the thus cleaned tab bodies were dried. Subsequently, the tab bodies were subjected to an electroplating process using a triazine thiol solution to obtain plated tabs. The plated tabs were bonded to a lithium cell to complete a lithium ion battery module.

2. Both the surfaces of a 40 μm thick aluminum foil were subjected to a chemical conversion treatment. A 25 μm thick oriented nylon film was laminated to the one of the surfaces of the aluminum foil by a dry-lamination process. A 30 μm thick molten resin film of a MDPE resin, as a heat-sealable layer, was extruded on the other surface of the aluminum foil, processing the surface of the molten resin film to be bonded to the aluminum foil by an ozone treatment to form a laminated structure. The laminated structure was heated at a temperature not lower than the softening point of the MDPE resin to obtain a sample laminated structure. The sample laminated structure was pressed to form an embossed package body and was cut to form a lid.

3. The lithium ion battery module provided with the tabs held between 100 μm thick adhesive films of an acid-denatured LLDPE resin was put in the embossed package body, the lid was put on the embossed package body, and a peripheral part of the lid was bonded to the flange of the embossed package body to form a sealed part by heat-sealing so that the tabs extend through the sealed part to obtain a sample lithium ion battery in Example 2-6.

Comparative Example 2-1 (Pouch)

1. Tabs were immersed in a 0.1 N sulfuric acid solution for 10 s, the tabs were cleaned with water and the thus cleaned tabs were dried. The tabs were bonded to a lithium cell to complete a lithium ion battery module.

2. A laminated structure for forming the package was made by the following procedure.

One of the surfaces of a 20 μm thick aluminum foil was subjected to a chemical conversion treatment. A 16 μm thick oriented polyester resin film was laminated to the other surface of the aluminum foil by a dry-lamination process. A 50 μm thick film of an acid-denatured polypropylene resin was laminated to the surface treated by the chemical conversion treatment of the aluminum foil by a dry-lamination process to obtain a sample laminated structure. The sample laminated structure was processed to form sample pouches.

3. The battery module was put in the pouch and an open end part of the pouch was sealed to form a sealed fin so that the tabs extends through the sealed fin to obtain a sample lithium ion battery in Comparative example 2-1.

Comparative Example 2-2 (Embossed Package)

1. Tab bodies were immersed in a 0.1 N sulfuric acid solution for 10 s, the tab bodies were cleaned with water and the thus cleaned tab bodies were dried to obtain tabs. The tabs were bonded to a lithium cell to complete a lithium ion battery module.

2. Both the surfaces of a 40 μm thick aluminum foil were subjected to a chemical conversion treatment. A 25 μm thick oriented nylon film was laminated to one of the surfaces of the aluminum foil by a dry-lamination process. A 30 μm thick molten resin film of a MDPE resin, as a heat-sealable layer, was extruded on the other surface of the aluminum foil, processing the surface of the molten resin film to be bonded to the aluminum foil by an ozone treatment to form a laminated structure. The laminated structure was heated at a temperature not lower than the softening point of the MDPE resin to obtain a sample laminated structure. The sample laminated structure was pressed to form an embossed package body and was cut to form a lid.

3. The tabs held between 100 μm thick adhesive films of an acid-denatured LLDPE resin were attached to a battery module, the battery module was placed in the hollow part of the embossed package body, the lid was put on the embossed package body and a peripheral part of the lid was bonded to the flange of the embossed package body by heat-sealing to obtain a sample lithium ion battery in Comparative example 2-2.

Evaluation

The sample lithium ion batteries were held with the tabs extended downward, 5 g of an electrolyte prepared by adding 1 mol lithium phosphate hexafluoride to a 1:1:1 mixture of ethylene carbonate, diethyl carbonate and dimethyl carbonate was put in each of the sample pouches and embossed packages, and the sample lithium batteries were held at 85° C. for thirty days. Then, the sample lithium ion batteries were examined visually to see if the contents were leaking from the packages through parts around the tabs.

Test Results

None of the sample lithium ion batteries in Examples 2–1 to 2-6 leaked, and parts around the tabs of the packages of the sample lithium ion batteries in Examples 2–1 to 2-6 were satisfactorily sealed. Parts around the negative tabs of aluminum of 400 sample lithium ion batteries among 1000 sample lithium ion batteries in Comparative example 2-1 leaked. Similarly, Parts around the negative tabs of aluminum of 500 sample lithium ion batteries among 1000 sample lithium ion batteries in Comparative example 2-2 leaked.

According to the present invention, the tabs coated with the corrosion-resistant layer are surely bonded to the package, the dissolution and corrosion of the surfaces of the tabs by hydrofluoric acid produced by interaction between the electrolyte of the lithium ion battery and moisture penetrated the package can be prevented, and sealing of parts around the tabs of the package is stabilized.

What is claimed is:

1. A battery comprising:

a battery module provided with a metal tab; and a package having a base layer, an aluminum layer, an innermost heat-sealable layer, and a bonding layer between the base layer and the aluminum layer, and holding the battery module therein such that the metal tab extends outside from the package;

wherein (1) the package has a heat-sealed peripheral part, and a part of the tab corresponding to the heat-sealed peripheral part is provided with a corrosion-resistant layer formed by a chemical conversion treatment, (2) the part of the tab corresponding to the corrosion-resistant layer has been degreased, and (3) a first corrosion-resistant layer is formed on a surface of the aluminum layer on the side of the innermost heat sealable layer by a chemical conversion treatment.

2. The battery according to claim 1, wherein a second corrosion-resistant layer is formed on a surface of the aluminum layer on the side of the base layer by a chemical conversion treatment.

3. The battery according to claim 1, wherein an adhesive film is wound around the tabs.

4. A tab manufacturing method comprising the steps of:

preparing a metal sheet for forming a tab body;

slitting the metal sheet into the tab body;

degreasing an entire surface of the tab body;

applying a solution prepared by mixing a phosphate, chromic acid, a fluoride and a triazine thiol compound to the degreased surface of the tab body; and drying the solution applied to the tab body to coat the tab body with a film, and heating the film at a temperature not lower than 180° C. to form a corrosion-resistant layer on the tab body.

5. A battery comprising:

a battery module provided with a metal tab; and a package having an innermost heat-sealable layer and holding the battery module therein such that the metal tab extends outside from the package;

wherein the package has a heat-sealed peripheral part, and a part of the tab corresponding to the heat-sealed peripheral part is provided with a corrosion-resistant layer formed by a chemical conversion treatment, and wherein the corrosion-resistant layer of the tab is formed by using a processing solution prepared by mixing a phenolic resin, a chromium fluoride (3) compound and phosphoric acid, so that the corrosion-resistant layer includes a composition consisting of the phenolic resin, the chromium fluoride (3) and the phosphoric acid.

6. The battery according to claim 5, wherein (1) the package further comprises a base layer, an aluminum layer, and a bonding layer between the base layer and the aluminum layer, and (2) a first corrosion-resistant layer is formed on a surface of the aluminum layer on the side of the innermost heat sealable layer by a chemical conversion treatment.

7. The battery according to claim 6, wherein
a second corrosion-resistant layer is formed on a surface of the aluminum layer on the side of the base layer by a chemical conversion treatment.

8. The battery according to claim 5, wherein an adhesive film is wound around the tabs.

9. A battery comprising:
a battery module provided with a metal tab; and
a package having an innermost heat-sealable layer and holding the battery module therein such that the metal tab extends outside from the package;
wherein the package has a heat-sealed peripheral part and a part of the tab corresponding to the heat-sealed peripheral part is provided with a corrosion-resistant layer formed by a chemical conversion treatment,
wherein the part of the tab corresponding to the corrosion-resistant layer has been degreased, and
wherein the corrosion-resistant layer of the tab is formed by using a processing solution prepared by mixing a phenolic resin, a chromium fluoride (3) compound and phosphoric acid, so that the corrosion-resistant layer includes a composition consisting of the phenolic resin, the chromium fluoride (3) compound and the phosphoric acid.

10. The battery according to claim 9, wherein
the package further comprises a base layer, an aluminum layer, and a bonding layer between the base layer and the aluminum layer, and a first corrosion-resistant layer is formed on a surface of the aluminum layer on the side of the innermost heat sealable layer by a chemical conversion treatment.

11. The battery according to claim 10, wherein
a second corrosion-resistant layer is formed on a surface of the aluminum layer on a side of the base layer by a chemical conversion treatment.

12. The battery according to claim 9, wherein an adhesive film is wound around the tabs.

13. A metal tab for a battery including a sealed package having a sealed peripheral part and a battery module held in the package, attached to the battery module and extending outside through the sealed peripheral part of the package, said metal tab comprising:
a tab body; and
a corrosion-resistant layer formed on a part of the tab body corresponding to the sealed peripheral part of the package by a chemical conversion treatment,
wherein the corrosion-resistant layer is formed by using a processing solution prepared by mixing a phenolic resin, a chromium fluoride (3) compound and phosphoric acid, so that the corrosion-resistant layer includes a composition consisting of the phenolic resin, the chromium fluoride (3) compound and the phosphoric acid.

14. A metal tab for a battery including a sealed package having a sealed peripheral part and a battery module held in the package, attached to the battery module and extending outside through the sealed peripheral part of the package, said metal tab comprising:
a tab body; and
a corrosion-resistant layer formed on a part of the tab body corresponding to the sealed peripheral part of the package by a chemical conversion treatment,
wherein the part of the tab body corresponding to the corrosion-resistant layer has been degreased and wherein the corrosion-resistant layer is formed by using a processing solution prepared by mixing a phenolic resin, a chromium fluoride (3) compound and phosphoric acid, so that the corrosion-resistant layer includes a composition consisting of the phenolic resin, the chromium fluoride (3) compound and the phosphoric acid.

* * * * *